United States Patent
Li et al.

(10) Patent No.: US 11,261,972 B1
(45) Date of Patent: Mar. 1, 2022

(54) COMBINED SEALING DEVICE WITH MAGNETIC FLUID

(71) Applicant: Tsinghua University, Beijing (CN)

(72) Inventors: Decai Li, Beijing (CN); Yanwen Li, Beijing (CN); Zepeng Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/508,166

(22) Filed: Oct. 22, 2021

(30) Foreign Application Priority Data

Nov. 23, 2020 (CN) .......................... 202011322506.6
Nov. 23, 2020 (CN) .......................... 202022731479.X

(51) Int. Cl.
*F16J 15/43* (2006.01)
*F16J 15/447* (2006.01)

(52) U.S. Cl.
CPC ........... *F16J 15/43* (2013.01); *F16J 15/4476* (2013.01)

(58) Field of Classification Search
CPC ................................ F16J 15/43; F16J 15/4476
See application file for complete search history.

(56) References Cited

U.S. PATENT DOCUMENTS

| | | | |
|---|---|---|---|
| 4,948,152 A * | 8/1990 | Kilthau | F16J 15/43 277/347 |
| 2011/0215533 A1* | 9/2011 | Li | F16J 15/43 277/410 |
| 2011/0248449 A1* | 10/2011 | Li | F16J 15/43 277/302 |
| 2012/0018958 A1* | 1/2012 | Kung | F16J 15/43 277/410 |
| 2019/0063613 A1* | 2/2019 | Sato | F16J 15/43 |
| 2020/0132197 A1* | 4/2020 | Takahashi | F16C 19/06 |

FOREIGN PATENT DOCUMENTS

| | | | |
|---|---|---|---|
| CN | 104315151 | | 1/2015 |
| CN | 208535157 | | 2/2019 |
| CN | 208535157 U | * | 2/2019 |
| CN | 209041569 | | 6/2019 |
| CN | 110848394 | | 2/2020 |

(Continued)

OTHER PUBLICATIONS

CNIPA, First Office Action for CN Application No. 202011322506.6, dated Mar. 30, 2021.

(Continued)

*Primary Examiner* — Vishal A Patel
(74) *Attorney, Agent, or Firm* — Hodgson Russ LLP

(57) ABSTRACT

A combined sealing device with magnetic fluid includes a housing having a chamber; a rotating shaft rotatably arranged in the chamber; a seal assembly fitted over the rotating shaft and located in the chamber, in which the seal assembly includes a brush seal part, a magnetic fluid seal part, and a labyrinth seal part all fitted over the rotating shaft and spaced apart from one another in an axial direction of the rotating shaft, the brush seal part being arranged adjacent to the sealing cavity, and the magnetic fluid seal part being arranged between the brush seal part and the labyrinth seal part; and an absorption part arranged in the brush seal part and configured to adsorb a sealing medium spilled from the sealing cavity.

8 Claims, 2 Drawing Sheets

(56) References Cited

FOREIGN PATENT DOCUMENTS

| | | | |
|---|---|---|---|
| DE | 3539777 A1 * | 5/1987 | ............... F16J 15/40 |
| DE | 102011050904 | 12/2012 | |
| JP | H01307205 | 12/1989 | |
| JP | H1030732 | 2/1998 | |
| JP | 2968926 | 11/1999 | |

OTHER PUBLICATIONS

CNIPA, Notification to Grant Patent Right for Invention for CN Application No. 202011322506.6, dated May 26, 2021.
CNIPA, Notification to Grant Patent Right for Invention for CN Application No. 202022731479.X, dated Jul. 27, 2021.

\* cited by examiner

COMBINED SEALING DEVICE WITH MAGNETIC FLUID

CROSS-REFERENCE TO RELATED APPLICATIONS

This application is based on and claims priority to Chinese Application No. 202011322506.6 and No. 202022731479.X, both filed on Nov. 23, 2020, the entire contents of which are incorporated herein by reference.

FIELD

This application relates to the field of powder sealing technology and, more particularly, to a combined sealing device with magnetic fluid.

BACKGROUND

In mechanical devices, seals belong to the key components, and devices often fail due to sealing problems, which cause substantial losses. With the increasing requirements for seals in modern industry, seals in a single form can hardly meet all the requirements, especially under special working conditions such as high pressure difference and high temperature difference. Magnetic fluid seals have the advantages of zero leakage, no wear, simple structure, long life, and easy maintenance, but the pressure resistance and high or low temperature resistance of the magnetic fluid seals is poor, and when the magnetic fluid seals are in dusty environment, dust may easily enter the sealing devices, leading to failure of the seals and reducing the service life of the seals.

SUMMARY

A combined sealing device with magnetic fluid is configured to seal a sealing cavity, and includes: a housing having a chamber; a rotating shaft rotatably arranged in the chamber; a seal assembly fitted over the rotating shaft and located in the chamber, in which the seal assembly includes a brush seal part, a magnetic fluid seal part, and a labyrinth seal part all fitted over the rotating shaft and spaced apart from one another in an axial direction of the rotating shaft, the brush seal part being arranged adjacent to the sealing cavity, and the magnetic fluid seal part being arranged between the brush seal part and the labyrinth seal part; an absorption part arranged in the brush seal part and configured to adsorb a sealing medium spilled from the sealing cavity; and an air supply assembly in the chamber, in which the air supply assembly is arranged on a side adjacent to the brush seal part and at an end away from the magnetic fluid seal part; and the air supply assembly includes: a fixing plate fitted over the rotating shaft, and a plurality of air supply members arranged at intervals in a peripheral direction of the fixing plate and configured to supply air toward the sealing cavity.

Figure 1:
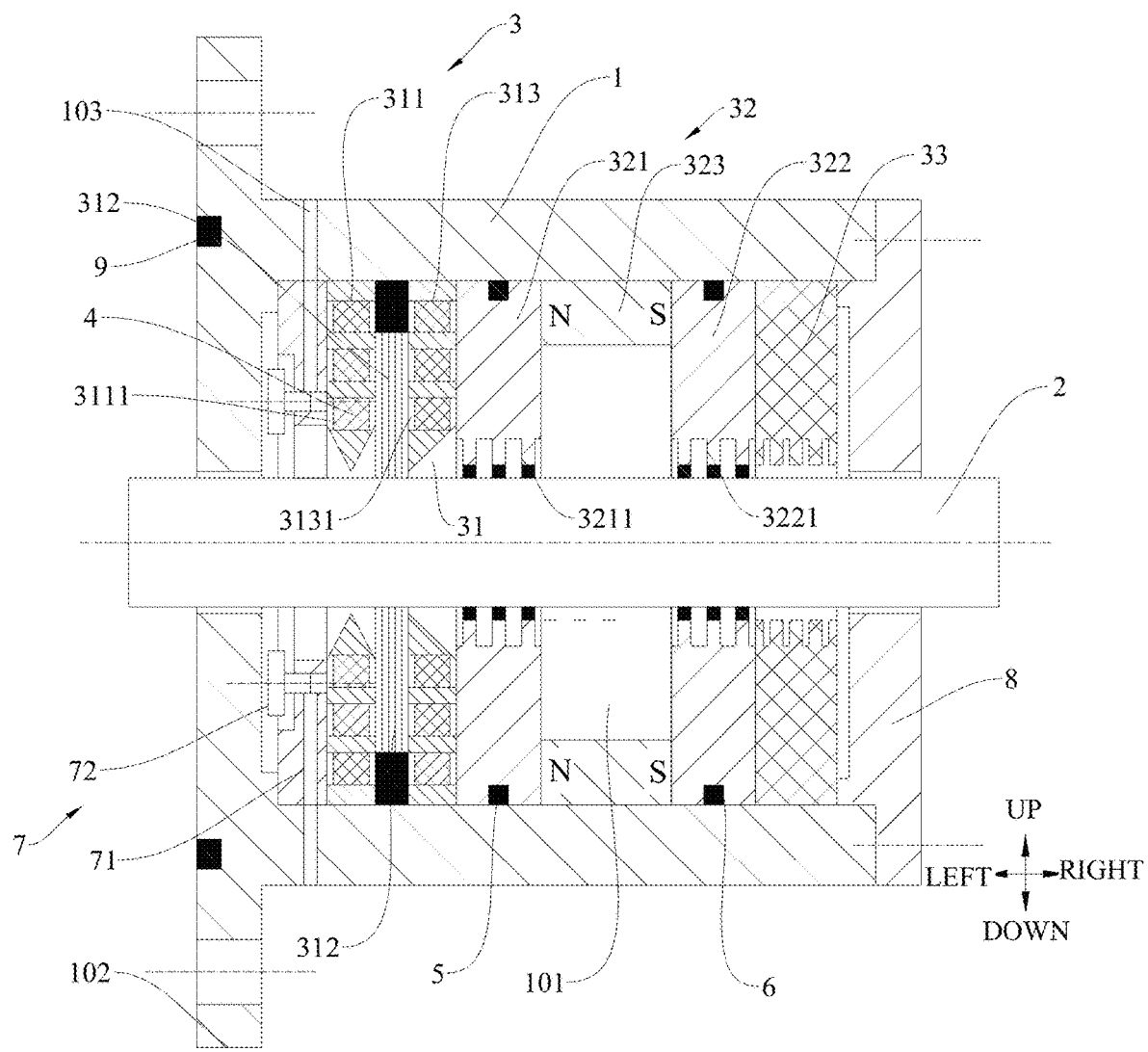
FIG. 1 is a schematic diagram of a combined sealing device with magnetic fluid according to an embodiment of the present disclosure.

REFERENCE NUMERALS housing 1, chamber 101, flange 102, through hole 103, rotating shaft 2,
seal assembly 3, brush seal part 31, first baffle 311, first mounting hole 3111, brush filament bundle 312, second baffle 313, second mounting hole 3131, magnetic fluid seal part 32, first pole piece 321, first pole tooth 3211, second pole piece 322, second pole tooth 3221, permanent magnet 323, labyrinth seal part 33,
absorption part 4, first seal ring 5, second seal ring 6,
air supply assembly 7, fixing plate 71, air supply member 72, end cap 8, third seal ring 9.

DETAILED DESCRIPTION

Embodiments of the present disclosure are described in detail below, and examples of the described embodiments are shown in accompanying drawings. The following embodiments described with reference to the accompanying drawings are exemplary and are intended to explain the present disclosure rather than limit the present disclosure.

Figure 2:
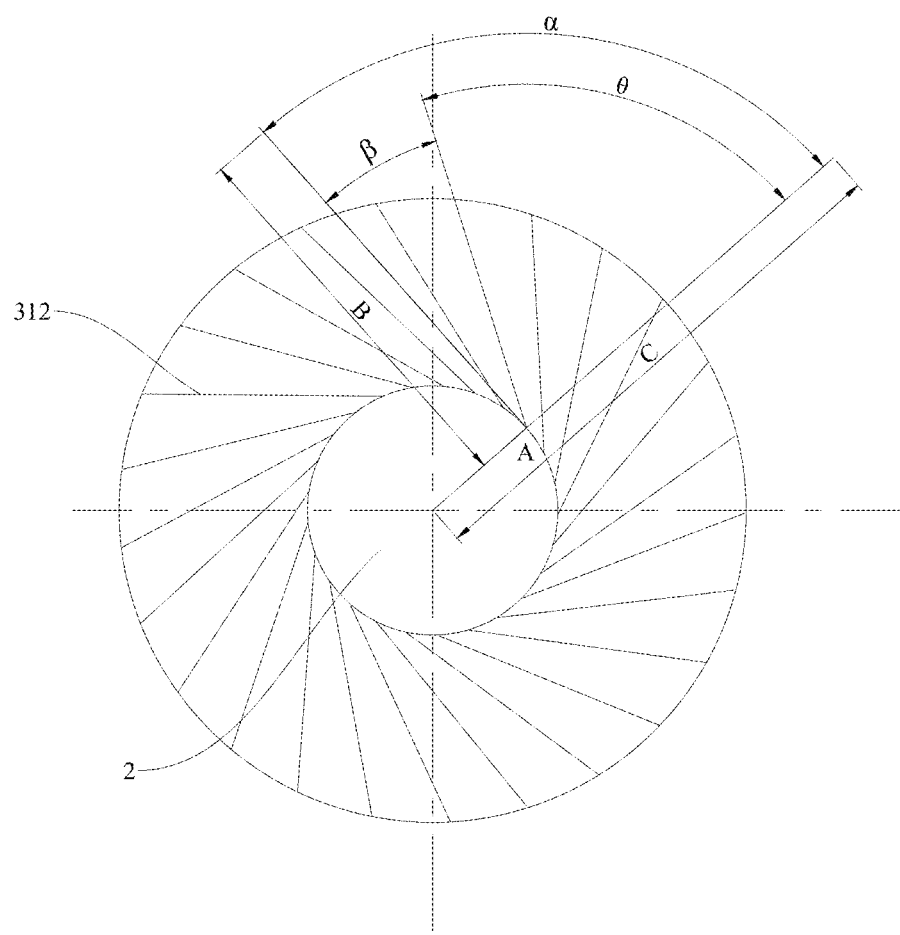
FIG. 2 is a schematic diagram illustrating how brush filament bundles are mounted in a combined sealing device with magnetic fluid according to an embodiment of the present disclosure.

As shown in FIGS. 1 and 2, a combined sealing device with magnetic fluid according to embodiments of the present disclosure is used to seal a sealing cavity. The sealing cavity in the present disclosure refers to a sealing cavity arranged in a component or device to be sealed. The combined sealing device is arranged outside and connected to the device to be sealed, to seal the device. The combined sealing device with magnetic fluid includes a housing 1, a rotating shaft 2, a seal assembly 3, and an absorption part 4.

The housing 1 has a chamber 101 therein. As shown in FIG. 1, the housing 1 has a flange 102 at a left end of the housing. The flange 102 is provided with a plurality of threaded holes, and configured to be connected to the device to be sealed. The flange 102 is arranged adjacent to the sealing cavity.

The rotating shaft 2 is rotatably arranged in the chamber 101. As shown in FIG. 1, the rotating shaft 2 is rotatably arranged in the chamber 101 and extends in a left-right direction, and both left and right ends of the rotating shaft 2 protrude from the housing 1.

The seal assembly 3 is fitted over the rotating shaft 2 and located in the chamber 101. The seal assembly 3 includes a brush seal part 31, a magnetic fluid seal part 32, and a labyrinth seal part 33. The brush seal part 31, the magnetic fluid seal part 32, and the labyrinth seal part 33 are all fitted over the rotating shaft 2 and spaced apart from one another in an axial direction of the rotating shaft 2 (the left-right direction as shown in FIG. 1). The brush seal part 31 is arranged adjacent to the sealing cavity, and the magnetic fluid seal part 32 is arranged between the brush seal part 31 and the labyrinth seal part 33.

As shown in FIG. 1, the brush seal part 31 is located on a leftmost side of the seal assembly 3, and the labyrinth seal part 33 is located on a rightmost side of the seal assembly 3. A sealing gap is formed between the magnetic fluid seal part 32 and the rotating shaft 2 in an up-down direction, and magnetic fluid is adsorbed in the sealing gap.

The absorption part 4 is arranged in the brush seal part 31 and used to adsorb a sealing medium spilled from the sealing cavity. As shown in FIG. 1, a plurality of absorption parts 4 are arranged at intervals in the up-down direction. Specifically, a material of the absorption part 4 is activated carbon, but it can be understood that the material of the absorption part 4 in the present disclosure is not limited thereto, and may be, for example, activated alumina or molecular sieve.

For the combined sealing device with magnetic fluid according to the embodiments of the present disclosure, by providing the brush seal part 31, the magnetic fluid seal part 32, and the labyrinth seal part 33, the combination of the three can improve the resistance against pressure and high or low temperature; by providing the absorption part 4, the amount of dust going from the sealing cavity into the magnetic fluid can be reduced; and by providing the labyrinth seal part 33, the amount of dust from the outside into the magnetic fluid can be reduced. As a result, the service life of the combined sealing device can be prolonged.

In some embodiments, the labyrinth seal part 33 is provided with a plurality of protrusions on its inner peripheral surface, and the plurality of protrusions are spaced apart from each other in the axial direction of the rotating shaft 2. In some embodiments, the labyrinth seal part 33 is a filter plate, and an inner peripheral surface of the filter plate is provided with a plurality of protrusions arranged at intervals in the left-right direction, to form a labyrinth seal. A predetermined gap exists between the plurality of protrusions and the rotating shaft 2 in the up-down direction, and has a dimension of 0.15 mm to 0.3 mm. When the predetermined gap has a dimension of 0.15 mm to 0.3 mm, the sealing performance can be improved and the sealing medium can be prevented from leaking to the outside. It can be understood that the number of protrusions in the present disclosure is adapted to a size of the rotating shaft 2, and will not be particularly defined herein.

The combined sealing device with magnetic fluid according to the embodiments of the present disclosure can reduce pressure difference between the outside and the sealing cavity and improve the sealing performance, by means of the labyrinth seal part 33. For example, when the sealing cavity needs vacuum sealing, such as sealing for metal powder, the labyrinth seal part 33 can lower the pressure difference between the outside and the sealing cavity, thus reducing the pressure exerted on the magnetic fluid seal and improving the high pressure resistance of the combined sealing device with magnetic fluid, and the magnetic fluid seal can meet vacuum sealing requirements. In addition, the labyrinth seal part 33 is a filter plate that can filter the external dust, reduce the dust going from the outside into the magnetic fluid, keep the magnetic fluid clean, and prolong the service life of the sealing device.

In some embodiments, the brush seal part 31 includes a first baffle 311, a brush filament bundle 312, and a second baffle 313. The first baffle 311, the brush filament bundle 312, and the second baffle 313 are fitted over the rotating shaft 2 and arranged at intervals in the axial direction of the rotating shaft 2. The brush bundle 312 is arranged between the first baffle 311 and the second baffle 313. The first baffle 311 has a first mounting hole 3111 penetrating the first baffle 311 in the axial direction of the rotating shaft 2, and the absorption part 4 is located in the first mounting hole 3111. The second baffle 313 has a second mounting hole 3131 penetrating the second baffle 313 in the axial direction of the rotating shaft 2, and the absorption part 4 is located in the second mounting hole 3131.

As shown in FIG. 1, the first baffle 311 and the second baffle 313 substantially have the same dimension in the left-right direction, and an outer periphery of the first baffle 311 and an outer periphery of the second baffle 313 are both in contact with an inner wall surface of the housing 1. A plurality of first mounting holes 3111 are arranged at intervals in the up-down direction, and a plurality of second mounting holes 3131 are arranged at intervals in the up-down direction. The number of the first mounting holes 3111 and the number of the second mounting holes 3131 are the same, and the sum of the number of the first mounting holes 3111 and the number of the second mounting holes 3131 is equal to the number of the absorption parts 4.

As shown in FIG. 2, a mounting angle of the brush filament bundle 312 is $\theta$ ranging from 40° to 60°. The mounting angle of the brush filament bundle 312 in the present disclosure is $\theta=\alpha-\beta$, in which $\alpha$ is an angle between a tangent line (line segment B as shown in FIG. 2) at a contact point (point A as shown in FIG. 2) of the brush filament bundle 312 with the rotating shaft 2 and a line connecting the contact point with a center of a circle of the rotating shaft 2 (line segment C as shown in FIG. 2), and $\beta$ is an angle between the brush filament bundle 312 and the tangent line.

The first baffle 311, the second baffle 313, and the brush filament bundle 312 in the combined sealing device with magnetic fluid according to embodiments of the present disclosure are all fitted over the rotating shaft 2, which makes it convenient to mount and disassemble the brush seal part 31. When the brush seal parts 31 need replacement for maintenance, only the brush filament bundle 312 needs to be replaced, which reduces the maintenance cost. The brush filament bundle 312 is arranged at an inclination angle of 40° to 60°, which can absorb radial displacement of a rotor and ensure minimal force on a free end of the brush filament bundle during contact, prolonging the service life of the brush filament bundle 312. Moreover, the brush filament bundle 312 can block the sealing medium in the sealing cavity from entering the magnetic fluid, and the absorption part 4 can adsorb the sealing medium, reducing the amount of sealing medium entering the magnetic fluid, and prolonging the service life of the magnetic fluid seal.

In some embodiments, the first baffle 311 and the second baffle 313 are each provided with sealing teeth on their respective inner peripheral surfaces, and a predetermined clearance exists between the sealing teeth and the rotating shaft 2 and in a radial direction of the rotating shaft 2. The predetermined clearance between the sealing teeth and the rotating shaft 2 ranges from 0.5 mm to 1 mm.

As shown in FIG. 1, a right end face of the first baffle 311 is in contact with a left end face of the brush filament bundle 312, and a left end face of the second baffle 313 is in contact with a right end face of the brush filament bundle 312. The sealing teeth on the inner peripheral surface of the first baffle 311 are individual teeth, and each of the sealing teeth on the inner peripheral surface of the first baffle 311 has a cross section substantially shaped as an isosceles triangle in the up-down direction. The sealing teeth on the inner peripheral surface of the second baffle 313 are individual teeth, and each of the sealing teeth on the inner peripheral surface of the second baffle 313 has a cross section in the up-down direction substantially shaped as a right triangle with one right-angled side in contact with the right end face of the brush filament bundle 312 and the other right-angled side in contact with the inner peripheral surface of the second baffle 313.

For the combined sealing device with magnetic fluid according to the embodiments of the present disclosure, the sealing teeth form a single-tooth structure similar to a labyrinth seal, and the clearance between the sealing teeth and the rotating shaft 2 ranges from 0.5 mm to 1 mm, such that the impact of the sealing medium on the brush filament bundle 312 can be reduced, and the second baffle 313 can protect the brush filament bundle 312 from deformation due to the impact of the sealing medium.

In some embodiments, the magnetic fluid seal part 32 includes a first pole piece 321, a second pole piece 322, and a permanent magnet 323. The first pole piece 321 and the second pole piece 322 are fitted over the rotating shaft 2 and spaced apart from each other in the axial direction of the rotating shaft 2. The permanent magnet 323 is arranged between the first pole piece 321 and the second pole piece 322. The first pole piece 321 is provided with a plurality of first pole teeth 3211 on an inner periphery of the first pole piece 321, and the plurality of first pole teeth 3211 are arranged at intervals in the axial direction of the rotating shaft 2. The magnetic fluid is absorbed between the plurality of first pole teeth 3211 and the rotating shaft 2. The second pole piece 322 is provided with a plurality of second pole teeth 3221 on an inner periphery of the second pole piece 322, and the plurality of second pole teeth 3221 are arranged at intervals in the axial direction of the rotating shaft 2. The magnetic fluid is absorbed between the plurality of second pole teeth 3221 and the rotating shaft 2.

As shown in FIG. 1, the first pole piece 321 and the second pole piece 322 have the same dimension in the left-right direction, a left end of the first pole piece 321 is in contact with a right end face of the second baffle 313, and a right end face of the second pole piece 322 is in contact with a left end of the labyrinth seal part 33.

In some embodiments, the first pole piece 321 is provided with a groove on an outer peripheral surface of the first pole piece 321, and the second pole piece 322 is provided with a groove on an outer peripheral surface of the second pole piece 322. The combined sealing device further includes a first seal ring 5 and a second seal ring 6, the first seal ring 5 being arranged in the groove of the first pole piece 321 and the second seal ring 6 being arranged in the groove of the second pole piece 322.

In embodiments of the present disclosure, by providing the first seal ring 5 and the second seal ring 6, it is possible to prevent the sealing medium from leaking between the outer peripheral surface of the pole piece and the inner wall surface of the housing 1, and improve the sealing performance of the magnetic fluid seal.

In some embodiments, the combined sealing device with magnetic fluid also includes an air supply assembly 7 located in the chamber 101. The air supply assembly 7 is arranged on a side adjacent to the brush seal part 31 and at an end away from the magnetic fluid seal part 32. The air supply assembly 7 includes a fixing plate 71 and a plurality of air supply members 72. The fixing plate 71 is fitted over the rotating shaft 2. The plurality of air supply members 72 are arranged at intervals in a peripheral direction of the fixing plate 71 and supply air toward the sealing cavity.

As shown in FIG. 1, the air supply assembly 7 is located on a left side of the brush seal part 31, and the plurality of air supply members 72 are connected to an external power supply through wires. The housing 1 is provided with a through-hole 103 through which the wires pass. There are two to six air supply members 72, and specifically, the air supply members 72 are fans.

The combined sealing device with magnetic fluid according to embodiments of the present disclosure can supply air into the sealing cavity by means of the air supply assembly 7, so that the sealing medium in the sealing cavity cannot easily enter the sealing device, and the service life of the sealing device can be prolonged.

In some embodiments, the combined sealing device with magnetic fluid further includes an end cap 8 located at an end of the housing 1, and the rotating shaft 2 passes through the end cap 8. As shown in FIG. 1, the end cap 8 is located at a right end of the housing 1 and connected to the housing 1 by a bolt, the rotating shaft 2 passes through the end cap 8, and a left end face of the end cap 8 abuts against a right end face of the labyrinth seal part 33.

The combined sealing device with magnetic fluid according to embodiments of the present disclosure improves the sealing of the housing 1 by means of the end cap 8.

In some embodiments, the housing 1 is provided with a groove at an end corresponding to the end cap 8, and the combined sealing device with magnetic fluid further includes a third seal ring 9 arranged in the groove of the housing 1. As shown in FIG. 1, a left end of the housing 1 is provided with the groove, and the third seal ring 9 is arranged in the groove at the left end of the housing 1.

The combined sealing device with magnetic fluid according to embodiments of the present disclosure improves the sealing between the housing 1 and the sealing cavity by means of the third seal ring.

The combined sealing device with magnetic fluid according to some specific examples of the present disclosure will be described below with reference to FIGS. 1 and 2.

The combined sealing device with magnetic fluid according to embodiments of the present disclosure is used to seal a sealing cavity, and includes a housing 1, a rotating shaft 2, a seal assembly 3, an absorption part 4, a first seal ring 5, a second seal ring 6, an air supply assembly 7, an end cap 8, and a third seal ring 9.

The housing 1 has a chamber 101 therein.

The rotating shaft 2 is arranged within the chamber 101 and is horizontally rotatable in a left-right direction.

The seal assembly 3 is fitted over the rotating shaft 2 and arranged in the chamber 101. The seal assembly 3 includes a brush seal part 31, a magnetic fluid seal part 32, and a labyrinth seal part 33. The brush seal part 31, the magnetic fluid seal part 32, and the labyrinth seal part 33 are fitted over the rotating shaft 2. The brush seal part 31, the magnetic fluid seal part 32, and the labyrinth seal part 33 are spaced apart from one another in the left-right direction. The brush seal part 31 is located at a leftmost side of the seal assembly 3, the labyrinth seal part 33 is located at a rightmost side of the seal assembly 3, and the magnetic fluid seal part 32 is located between the brush seal part 31 and the labyrinth seal part 33. There is a sealing gap between the magnetic fluid seal part 32 and the rotating shaft 2 in an up-down direction, and the magnetic fluid is adsorbed in the sealing gap.

The labyrinth seal part 33 is provided with a plurality of protrusions on its inner peripheral surface, and the plurality of protrusions are arranged at intervals in an axial direction of the rotating shaft 2.

The brush seal part 31 includes a first baffle 311, a brush filament bundle 312 and a second baffle 313. The first baffle 311, the brush filament bundle 312 and the second baffle 313 are fitted over the rotating shaft 2. The first baffle 311, the brush filament bundle 312 and the second baffle 313 are arranged at intervals in the left-right direction, and the brush filament bundle 312 is located between the first baffle 311 and the second baffle 313. The first baffle 311 is provided with a first mounting hole 3111 penetrating the first baffle 311 in the left-right direction. There are a plurality of first mounting holes 3111 arranged at intervals in the up-down direction. The second baffle 313 is provided with a second mounting hole 3131 penetrating the second baffle 313 in the left-right direction. There are a plurality of second mounting holes 3131 arranged at intervals in the up-down direction. The number of the first mounting holes 3111 is identical to the number of the second mounting holes 3131, and the sum of the number of the first mounting holes 3111 and the number of the second mounting holes 3131 is equal to the number of the absorption parts 4.

The first baffle 311 and the second baffle 313 are both provided with sealing teeth on their respective inner peripheral surfaces, and there is a predetermined clearance between the sealing teeth and the rotating shaft 2 and in a radial direction of the rotating shaft 2.

A right end face of the first baffle 311 is in contact with a left end face of the brush filament bundle 312, and a left end face of the second baffle 313 is in contact with a right end face of the brush filament bundle 312. The sealing teeth on the inner peripheral surface of the first baffle 311 are individual teeth, and each of the sealing teeth on the inner peripheral surface of the first baffle 311 has a cross section substantially shaped as an isosceles triangle in the up-down direction. The sealing teeth on the inner peripheral surface of the second baffle 313 are individual teeth, and each of the sealing teeth on the inner peripheral surface of the second baffle 313 has a cross section in the up-down direction substantially shaped as a right triangle with one right-angled side in contact with the right end face of the brush filament bundle 312 and the other right-angled side in contact with the inner peripheral surface of the second baffle 313.

The magnetic fluid seal part 32 includes a first pole piece 321, a second pole piece 322 and a permanent magnet 323. The first pole piece 321 and the second pole piece 322 are fitted over the rotating shaft 2 and spaced apart from each other in the left-right direction, the permanent magnet 323 being arranged between the first pole piece 321 and the second pole piece 322. The first pole piece 321 is provided with a plurality of first pole teeth 3211 on an inner periphery of the first pole piece 321, and the plurality of first pole teeth 3211 are arranged at intervals in the left-right direction. The magnetic fluid is absorbed between the plurality of first pole teeth 3211 and the rotating shaft 2. The second pole piece 322 is provided with a plurality of second pole teeth 3221 on an inner periphery of the second pole piece 322, and the plurality of second pole teeth 3221 are arranged at intervals in the left-right direction. The magnetic fluid is absorbed between the plurality of second pole teeth 3221 and the rotating shaft 2.

The first pole piece 321 is provided with a groove on an outer peripheral surface of the first pole piece 321, and the second pole piece 322 is provided with a groove on an outer peripheral surface of the second pole piece 322. The first seal ring 5 is arranged in the groove of the first pole piece 321 and the second seal ring 6 is arranged in the groove of the second pole piece 322.

There are a plurality of absorption parts 4 arranged at intervals in the up-down direction. The plurality of absorption parts 4 are arranged in the first mounting hole 3111 and the second mounting hole 3131 separately. The sum of the number of the first mounting holes 3111 and the second mounting holes 3131 is equal to the number of absorption parts 4.

The air supply assembly 7 is arranged in the chamber 101 and located on a left side of the brush seal part 31. The air supply assembly 7 includes a fixing plate 71 and a plurality of air supply members 72. The fixing plate 71 is fitted over the rotating shaft 2. The plurality of air supply members 72 are arranged at intervals in a peripheral direction of the fixing plate 71 and supply air toward the sealing cavity. The plurality of air supply members 72 are connected to an external power supply through wires, and the housing 1 is provided with a through-hole 103 through which the wires pass.

The end cap 8 is arranged at a right end of the housing 1 and connected to the housing 1 by a bolt, the rotating shaft 2 passes through the end cap 8, and a left end face of the end cap 8 abuts against a right end face of the labyrinth seal part 33.

A left end of the housing 1 is provided with a groove, and the third seal ring 9 is arranged in the groove at the left end of the housing 1.

A principle of operation of the combined sealing device with magnetic fluid according to embodiments of the present disclosure will be described below with reference to FIGS. 1 and 2.

After the combined sealing device with magnetic fluid according to embodiments of the present disclosure is connected to external equipment, the labyrinth seal part 33 can reduce the pressure difference between the outside and the sealing cavity and hence the pressure borne by the magnetic fluid seal, improving the high pressure resistance of the combined sealing device with magnetic fluid, and meanwhile the magnetic fluid seal can meet the vacuum sealing requirements. In addition, the labyrinth seal part 33 can filter external dust, reduce the amount of outside dust going into the magnetic fluid, keep the magnetic fluid clean, and prolong the service life of the sealing device. The air supply members 72 can supply air to one side of the sealing cavity, so that the sealing medium will not easily enter the sealing device, the brush seal part 31 can also block the sealing medium from further entering the sealing device, and the absorption part 4 can adsorb the sealing medium entering the sealing device.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not indicate or imply that the device or element referred to must have a particular orientation, or be constructed and operated in a particular orientation. Thus, these terms shall not be construed as limitation on the present disclosure.

In addition, terms such as "first" and "second" are merely used for descriptive purposes and cannot be understood as indicating or implying relative importance or the number of technical features indicated. Thus, the features defined with "first" and "second" may explicitly or implicitly include at least one of the features. In the description of the present disclosure, unless otherwise specifically defined, "a plurality of" means at least two, such as two, three, etc.

In the present disclosure, unless otherwise explicitly specified and defined, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless otherwise explicitly specified and defined, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been shown and described above, it can be understood that the above embodiments are exemplary and shall not be understood as limitation on the present disclosure, and changes, modifications, alternatives and variations can be made in the above embodiments within the scope of the present disclosure.

What is claimed is:

1. A combined sealing device with magnetic fluid, configured to seal a sealing cavity, and comprising:
    a housing having a chamber;
    a rotating shaft rotatably arranged in the chamber;
    a seal assembly fitted over the rotating shaft and located in the chamber, wherein the seal assembly comprises a brush seal part, a magnetic fluid seal part, and a labyrinth seal part; the brush seal part, the magnetic fluid seal part, and the labyrinth seal part are all fitted over the rotating shaft and spaced apart from one another in an axial direction of the rotating shaft; the brush seal part is arranged adjacent to the sealing cavity, and the magnetic fluid seal part is arranged between the brush seal part and the labyrinth seal part;
    an absorption part arranged in the brush seal part and configured to adsorb a sealing medium spilled from the sealing cavity; and
    an air supply assembly in the chamber, wherein the air supply assembly is arranged on a side adjacent to the brush seal part and at an end away from the magnetic fluid seal part; and the air supply assembly comprises: a fixing plate fitted over the rotating shaft, and a plurality of air supply members arranged at intervals in a peripheral direction of the fixing plate and configured to supply air toward the sealing cavity.

2. The combined sealing device according to claim 1, wherein the labyrinth seal part is provided with a plurality of protrusions on an inner peripheral surface of the labyrinth seal part, and the plurality of protrusions are spaced apart from each other in the axial direction of the rotating shaft.

3. The combined sealing device according to claim 1, wherein:
    the brush seal part comprises a first baffle, a brush filament bundle, and a second baffle;
    the first baffle, the brush filament bundle, and the second baffle are fitted over the rotating shaft and spaced apart from one another in the axial direction of the rotating shaft, and the brush bundle is arranged between the first baffle and the second baffle;
    the first baffle has a first mounting hole penetrating the first baffle in the axial direction of the rotating shaft, and the absorption part is located in the first mounting hole; and
    the second baffle has a second mounting hole penetrating the second baffle in the axial direction of the rotating shaft, and the absorption part is located in the second mounting hole.

4. The combined sealing device according to claim 3, wherein the first baffle and the second baffle are both provided with sealing teeth on their respective inner peripheral surfaces, and a predetermined clearance exists between the sealing teeth and the rotating shaft and in a radial direction of the rotating shaft.

5. The combined sealing device according to claim 1, wherein:
    the magnetic fluid seal part comprises a first pole piece, a second pole piece, and a permanent magnet, the first pole piece and the second pole piece are fitted over the rotating shaft and spaced apart from each other in the axial direction of the rotating shaft, and the permanent magnet is arranged between the first pole piece and the second pole piece;
    the first pole piece is provided with a plurality of first pole teeth on an inner periphery of the first pole piece, and the plurality of first pole teeth are arranged at intervals in the axial direction of the rotating shaft, the magnetic fluid being absorbed between the plurality of first pole teeth and the rotating shaft; and
    the second pole piece is provided with a plurality of second pole teeth on an inner periphery of the second pole piece, and the plurality of second pole teeth are arranged at intervals in the axial direction of the rotating shaft, the magnetic fluid being absorbed between the plurality of second pole teeth and the rotating shaft.

6. The combined sealing device according to claim 5, wherein:
    the first pole piece has a groove on an outer peripheral surface of the first pole piece, and the second pole piece has a groove on an outer peripheral surface of the second pole piece; and
    the combined sealing device further comprises a first seal ring and a second seal ring, the first seal ring being arranged in the groove of the first pole piece and the second seal ring being arranged in the groove of the second pole piece.

7. The combined sealing device according to claim 1, further comprising an end cap arranged at an end of the housing, the rotating shaft passing through the end cap.

8. The combined sealing device according to claim 7, wherein the housing has a groove at an end corresponding to the end cap, and the combined sealing device further comprises a third seal ring arranged in the groove of the housing.

* * * * *